A. C. EASTWOOD & J. H. HALL.
ELECTRIC CONTROLLER.
APPLICATION FILED JUNE 20, 1911.

1,053,484.

Patented Feb. 18, 1913.
3 SHEETS—SHEET 1.

WITNESSES

INVENTORS
A. C. Eastwood
J. H. Hall
By ATTORNEY

A. C. EASTWOOD & J. H. HALL.
ELECTRIC CONTROLLER.
APPLICATION FILED JUNE 20, 1911.

1,053,484.

Patented Feb. 18, 1913.
3 SHEETS—SHEET 2.

UNITED STATES PATENT OFFICE.

ARTHUR C. EASTWOOD AND JAY H. HALL, OF CLEVELAND, OHIO, ASSIGNORS TO THE ELECTRIC CONTROLLER AND MANUFACTURING COMPANY, OF CLEVELAND, OHIO, A CORPORATION OF OHIO.

ELECTRIC CONTROLLER.

1,053,484.      Specification of Letters Patent.      Patented Feb. 18, 1913.

Application filed June 20, 1911. Serial No. 634,305.

*To all whom it may concern:*

Be it known that we, ARTHUR C. EASTWOOD and JAY H. HALL, citizens of the United States, residing at Cleveland, in the county of Cuyahoga and State of Ohio, have invented new and useful Improvements in Electric Controllers, of which the following is a specification.

Our invention relates to improvements in electric controllers, and particularly that type which are used to control motors with shunt field winding and in which a field regulator is used in connection with the shunt field to control the speed of the motor. During the starting of such a motor it is desirable that the regulator be cut out of circuit while the motor is being accelerated in order that the field strength will be great enough to prevent arcing at the motor brushes, and to develop sufficient torque to start the load.

We have shown our invention used in connection with magnetically operated switches whose operating windings are energized by current in the motor circuit, and it is desirable upon the closure of the last resistance switch to hold this switch closed by means of a winding connected in shunt across the source of supply in order to prevent the opening of this switch should the motor current become zero or reversed. This often happens with motors driving line shafts or a heavy load having a flywheel effect wherein the fly-wheel will tend to drive the motor upon a sudden reduction of voltage on the line, thereby producing a negative current through the motor, which would cause the resistance controlling switch to open when its winding is dependent upon the motor current to hold it closed.

The objects of our invention are (1) to provide among other things a controller which will insure that the motor will be accelerated under full field excitation; (2) to maintain such excitation during the whole period of acceleration; and (3) to provide means to connect the field regulator automatically in the shunt field circuit after the last resistance controlling switch has operated.

Figure 1:
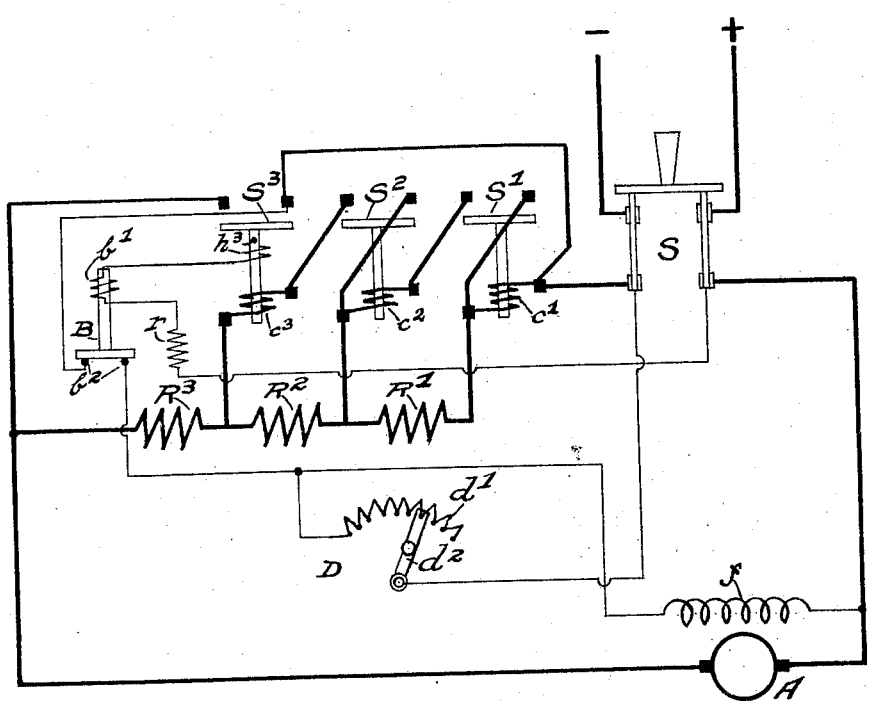
Figure 2:
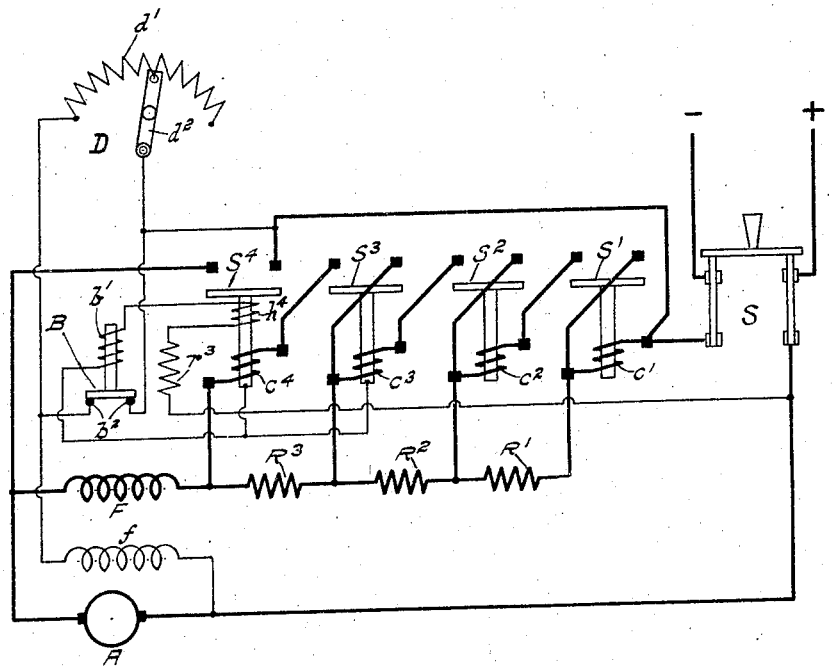
Figure 3:
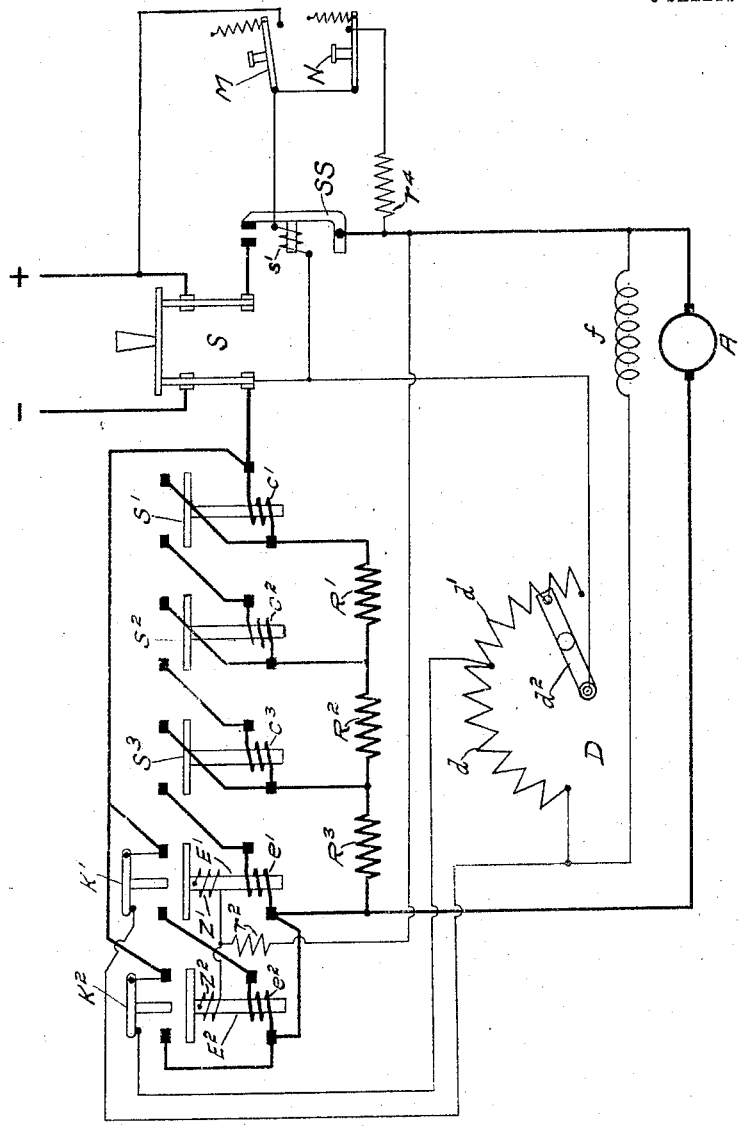

In the accompanying drawings, Figures 1, 2, and 3 show diagrammatically three ways in which our invention may be made.

Referring to Fig. 1, S is a knife switch for connecting the motor and controller to the source of supply. The armature of the motor is represented by A, the shunt field by $f$, the starting resistance by $R'$, $R^2$, $R^3$, and the resistance controlling switches by $S'$, $S^2$, $S^3$, having operating windings $c'$, $c^2$, $c^3$, respectively. The shunt field circuit is traced from positive through the field $f$; beyond which it has alternative paths, one directly to the negative through the contacts $b^2$ on the relay B, and the other to the negative through the resistance $d'$ of the field regulator D. The field regulator D consists essentially of a resistance $d'$, of the amount of which can be regulated by the position of a movable arm $d^2$. A relay B having the winding $b'$ operates to open the direct path to the negative or the short circuit around the resistance $d'$ of the regulator whenever its operating winding is energized. The resistance controlling switches are of the type described in Canfield's applications, Serial Number 583,000 filed September 21, 1910 and Serial Number 604,331, filed January 23, 1911, and in Eastwood's Patent, No. 1,040,292, granted October 8, 1912. In these applications and in this patent, particularly in Fig. 2, the switches have the peculiar characteristic that they remain in open position when their operating windings are energized above a predetermined value, and will operate to close their contacts when the energization falls below this value. Since the last resistance switch $S^3$ in operating connects the armature directly across the line, and short-circuits also its own operating coil $c^3$, it is necessary to provide holding means for maintaining said switch closed after it has operated. To this end we provide the switch $S^3$ with the holding coil $h^3$, one end of which is permanently connected to the bridging piece of said switch and the other end of which is connected in a circuit, easily traced, in series with the operating coil $b'$ of the relay B and the limiting resistance $r$ to the positive on the line switch S. This circuit will be energized as soon as the switch $S^3$ closes.

The operation of the controller is as follows: Upon the closure of the switch S, a circuit is established from the positive through the armature A, the starting resistance $R^3$, $R^2$, $R'$, and the operating coil $c'$ of the switch $S'$ to the negative. At the same time current flows in the shunt field circuit through the field winding $f$, and the contacts $b^2$ on the relay B to the negative. This condition allows the motor to start under full field excitation. The starting current limited by the resistance $R'$, $R^2$, $R^3$ is sufficient to start the motor, the value of the current being such that the switch $S'$ is locked open. As the motor speeds up, the armature current decreases, and when it reaches the value at which the switch $S'$ is adjusted to operate, the switch $S'$ closes its contacts, short-circuiting the resistance $R'$, and causes the winding of the switch $S^2$ to become energized. The rush of current in the armature circuit locks open the switch $S^2$ until, the motor increasing in speed and the current decreasing to the value at which the switch $S^2$ is adjusted to operate, the switch $S^2$ closes its contacts, short-circuits the resistance $R^2$ and connects in circuit the operating winding $c^3$ of the switch $S^3$. Owing to another rush of current in the armature circuit, the switch $S^3$ is locked open until, the speed of the motor increasing and the current diminishing to the value at which switch $S^3$ is adjusted to operate, the switch $S^3$ closes its contacts and short-circuits the last resistance $R^3$. The armature circuit is now easily traced from the positive through the armature A, and the contacts on the switch $S^3$ to the negative. The closing of the switch $S^3$ short-circuits the operative windings $c'$, $c^2$, and $c^3$, thereby deënergizing the same and causing the switches $S'$ and $S^2$ to drop to the open position. The switch $S^3$ would drop also were it not for the holding coil $h^3$ which is now energized by current which flows now from the positive through the resistance $r$, the coil $b'$, and the coil $h^3$ to the negative. The switch $S^3$ is held closed irrespective of the deënergization of the coil $c^3$. The energization of the coil $b'$ causes the relay B to lift, and open at the contacts $b^2$ the direct path to the negative of the shunt field circuit, leaving only the other path through the resistance $d'$ and the arm $d^2$ in the field circuit. The current in the shunt field $f$ is, therefore, weakened, causing a further acceleration of the motor to its maximum speed. The amount of the resistance $d'$ may be varied at will up to a certain maximum, whereby the maximum speed of the motor may be adjusted within certain limits. To stop the motor it is only necessary to open the switch S.

In Fig. 2, another switch $S^4$ is provided for short-circuiting the series field F and connecting the armature directly to the negative, this switch like the switches $S'$, $S^2$, and $S^3$ being of the type described in Canfield's application, Serial Number 583,000, which are locked open when the current in their operating coils is above a certain limit.

The shunt field circuit has two paths to the negative; one through the contacts $b^2$ bridged by the relay B and the other through the resistance $d'$ of the regulator D. Since the switch $S^4$ in closing its contacts short-circuits its own operating winding, it is necessary to provide said switch with means for holding it closed after it has operated. We, therefore, provide the switch $S^4$ with the holding coil $h^4$ connected in a circuit traced from the positive through the limiting resistance $r^3$, the coil $h^4$, the coil $b'$ of the relay B, and the bridging pieces of the switches $S^3$ and $S^4$. It will be seen that the coils $h^4$ and $b'$ and the resistance $r^3$ are connected in series in the same circuit.

The operation of the controller shown in Fig. 2 is as follows: Upon the closure of the switch S, a circuit is established from the positive through the armature A, the series field F, the starting resistance $R^3$, $R^2$, $R'$ and the winding $c'$ to the negative. At the same time another circuit is completed through the shunt field $f$, and the contacts $b^2$. The motor starts with an amount of current in the armature and series field limited by the starting resistance and with full shunt field excitation. The resistance switch $S'$ locks open until the acceleration of the motor causes the armature current to decrease to that value at which the switch $S'$ is adjusted to operate. At that moment the switch $S'$ closes its contacts, short-circuits the resistance $R'$, and connects the operating winding $c^2$ of the switch $S^2$ in circuit. The switch $S^2$ is also locked open by the rush of current and closes when the current diminishes to that value at which the switch $S^2$ is adjusted to operate, short-circuiting the resistance $R^2$ and connecting the operating winding $c^3$ of the switch $S^3$ in circuit. Likewise, the rush of current will lock open the switch $S^3$ until, owing to the acceleration of the motor, the armature current has decreased sufficiently to allow the switch $S^3$ to close its contacts, short-circuit the resistance $R^3$, connect the operating coil $c^4$ of the switch $S^4$ in the armature circuit, and complete the circuit through the coil $b^4$ of the relay B and the holding winding $h^4$. With switch $S^3$ closed, current flows from the positive through the armature A, the series field F, the winding $c^4$, the contacts $s^3$, the winding $c^3$, the contacts $S^2$, the winding $c^2$, the contacts $S'$, and the winding $c'$ to the negative, all the starting resistance being short-circuited. As soon as the switch $S^3$ closes, the relay B is energized, current flowing from the positive through the resistance $r^3$, the winding $h^4$, the coil $b'$, the bridging piece of the switch $S^3$, the contacts $S^2$, the winding $c^3$, the contacts $S^2$, the winding $c^2$, the contacts $S'$, and the winding $c'$ to the negative. The current flowing in this circuit does not cause the winding $h^4$ to close the switch S⁴ but energizes the coil $b'$ sufficiently to lift the relay B, thereby opening the direct path of the shunt field circuit at the contacts $b^2$, and leaving the shunt field $f$ connected to the negative only by way of the resistance $d'$. The opening of the relay causes a weakening of the current in the shunt field and a further increase of speed of the motor, but owing to the high inductance of the shunt field, the current in the shunt field circuit diminishes slowly and the increase of speed of the motor is gradual. The short-circuiting of the resistance section $R^3$ by the operation of the switch $S^3$ causes a rush of current in the armature circuit which, flowing through the winding $c^4$ locks the switch $S^4$ open. Although the operation of the switch $S^3$ completes a circuit through the coil $h^4$, its energization is insufficient to close the switch; but when the current in the armature circuit diminishes to the value at which the switch $S^4$ is adjusted to operate, the switch $S^4$ closes its contacts and short-circuits the series field F and the operating windings $c^4$, $c^3$, $c^2$, $c'$ of switches $S^4$, $S^3$, $S^2$, $S'$. The switches $S'$ $S^2$, $S^3$ drop to the open position, but the switch $S^4$ is held closed by the energization of the coil $h^4$. The short-circuiting of the series winding produces a further weakening of the motor field, which causes the motor to speed up to its maximum. The motor is stopped by opening the switch S. In case the resistance of the field regulator is so high that it is desirable to cut it in the shunt field circuit in several steps, we use the controller shown diagrammatically in Fig. 3, which also illustrates a push button system of control.

In Fig. 3, a knife switch is indicated at S, a main switch for the motor circuit at S S, the motor armature at A, the starting resistance at $R'$, $R^2$, $R^3$, and the resistance-controlling switches at $S'$, $S^2$, $S^3$. The push button M serves to start the motor and the button N to stop it. The resistance of the field regulator D is divided in two sections $d$ and $d'$, each provided with a short-circuit which is opened by the operation of the switches $E'$ and $E^2$, respectively. When the switch $E'$ closes its contacts, it opens an auxiliary contact $K'$, thus removing a short circuit around the section $d$, and when $E^2$ closes its contacts, it opens an auxiliary contact $K^2$, thus opening a short circuit around the section $d'$. The switches $S'$, $S^2$, $S^3$, $E'$ and $E^2$ are all of the Canfield type hereinbefore described.

The operation of the controller shown in Fig. 3 is as follows: The knife switch S is first closed; then upon depressing the push button M, an operating circuit is established from the positive through the button M, and the operating coil $s'$ of the main switch SS to the negative, which causes the switch SS to close. The push button M being released, opens its contacts but a maintaining circuit exists from the positive through the resistance $r^4$, the push button N, and the operating coils $s'$ of the switch SS to the negative. The closure of the main switch SS establishes the motor circuit from the positive through the knife switch S, the main switch SS, the armature A, the starting resistance $R^3$, $R^2$, $R'$ and the winding $c'$ of the resistance switch $S'$ to the negative. The field circuit is completed from the positive through the shunt field $f$ and thence directly to the negative, through the auxiliary contact $K'$ on the switch $E'$, no resistance being inserted in the field circuit. This is the starting position with the current in the armature circuit limited by the starting resistance and with full field excitation. The resistance switches $S'$, $S^2$, $S^3$ operate successively when the current in the armature circuit decreases to that value at which said switches are respectively adjusted to close thereby causing the motor to accelerate. When the resistance switch $S^3$ closes its contacts, it short-circuits the last resistance section $R^3$ and connects the operating winding $e'$ of the switch $E'$ in the armature circuit. The consequent rush of current locks out the switch $E'$ until the current diminishes to that value at which the switch $E'$ is adjusted to operate. At that moment the switch $E'$ closes its contacts, connects the operating winding $e^2$ of the switch $E^2$ in circuit, short-circuits the windings $c'$, $c^2$, $c^3$, and $e'$, and opens the auxiliary contact $K'$, thereby removing the short circuit around the resistance $d$. The switches $S'$, $S^2$, $S^3$ immediately drop to the open position and the switch $E'$ would do so but for the holding coil $Z'$, which is now energized, the holding circuit being traced from the positive through the main switch SS, the resistance $r^2$, the coil $Z'$ and the contacts of the switch $E'$ to the negative. The operation of the switch $E'$, short-circuiting the windings $c'$ to $e'$ inclusive and also weakening of the field current, causes the current in the armature circuit to increase sufficiently to lock the switch $E^2$ in the open position. When finally the current decreases to that value at which the switch $E^2$ is adjusted to operate, it closes its contacts, providing a direct path to the negative for the armature current, and opening the auxiliary contact $K^2$, which in turn opens the short-circuit around the resistance section $d'$ of the field regulator. The motor will now run at full speed. At the same time, the holding coil $Z^2$ is energized, the current flowing from the positive through the resistance $r^2$, the coil $Z^2$, and the contacts of the switch $E^2$ to the negative. Consequently, although the operating winding $e^2$ of the switch $E^2$ is short-circuited, the switch $E^2$ is held closed by the energization of the coil $Z^2$. If it is desired to cut in the resistance in the shunt field circuit in one step only, the switch E' only will be retained in the organization, the other switches like E² being discarded. To stop the motor, the push button N is depressed, whereupon the main switch SS is opened, thus cutting off the motor from the supply, and all the other switches drop to the open position. It is thus seen that the motor will always be started under full field excitation, and this condition of the field will continue throughout the acceleration of the motor, and that the regulator will then be automatically connected in, the resultant speed of the motor being that determined by the adjustment of the regulator. The usual method of starting the motor is to move the field regulator to the full field position before starting, and then to bring the motor up to the desired speed by adjusting the regulator. It often occurs that the operator will fail to do this, and our invention insures that the motor will always be started under proper field excitation.

It will be readily understood by those skilled in the art that a reverser for the motor, magnetically operated or otherwise, can be used in connection with our invention.

We have shown our invention used in connection with switches operated by the motor current, but it will be also readily understood that it can be used with other forms of switch or controller for starting the motor using shunt field regulation.

We do not limit our invention to controllers without reversers for the motors nor to modifications of the elements and combinations thereof shown and described provided the modifications come within the spirit of the invention defined in the appended claims.

We claim—

1. In an electric motor system, a motor, a rheostat therefor, a switch for controlling the rheostat, an operating winding therefor, energized by current through the motor, a shunt field for the motor, a regulator for the shunt field, a shunt for the regulator, and means controlled by the switch for removing the shunt.

2. In an electric controller, a circuit, a rheostat therefor, a switch for controlling the rheostat, an operating winding therefor, energized by current through the rheostat, a second circuit, a controlling device therefor, a shunt for the said device, and means controlled by the switch for removing the said shunt.

3. In an electric motor system, a motor, a circuit therefor, a resistance in the circuit means for cutting out the resistance, a shunt-field for the motor, a regulator therefor, a shunt for the regulator, and means for removing the said shunt only when the motor current has fallen to a certain value after the resistance has been cut out of the circuit.

4. In an electric motor system, a motor, a circuit for the motor, a shunt field, a regulator for the shunt field, a shunt for the regulator, and a switch having a winding in the motor circuit and adapted to remain open when the motor current is above a predetermined value and to close when the current is reduced, and means controlled by the switch for removing the said shunt from the regulator.

5. In an electric motor system, a motor, a resistance therefor, a switch having contacts for controlling the resistance, a shunt field for the motor, a shunt field regulator, a switch for shunting the regulator, and means including the said contacts of the resistance-controlling switch for opening the shunt when the resistance switch closes.

6. In an electric motor system, a motor, a resistance therefor, a pair of contacts connected to the resistance, a bridging piece coöperating therewith for controlling the resistance, a shunt field for the motor, a shunt field regulator, a switch for shunting the regulator, and an operating winding for the switch connected to the bridging piece.

7. In an electric motor system, a motor, a series of resistance sections therefor, a series of switches for the resistance sections, operating windings for the switches in the motor circuit, the last of the switches locking open when the current in its winding is above a predetermined value and closing when the current is reduced, a shunt field for the motor, a shunt field regulator, a relay normally shunting the regulator, an operating winding therefor, and means controlled by the last switch to close for energizing said winding.

Signed at Cleveland, Ohio, this 15th day of June, A. D. 1911.

ARTHUR C. EASTWOOD.
JAY H. HALL.

Witnesses:
P. C. CLARK,
G. L. TOVELL.

---

Copies of this patent may be obtained for five cents each, by addressing the "Commissioner of Patents, Washington, D. C."